Aug. 9, 1938.  G. D. POGUE  2,126,660
SPRING TYPE VIBRATION ISOLATING APPARATUS
Filed Aug. 29, 1934  2 Sheets-Sheet 1
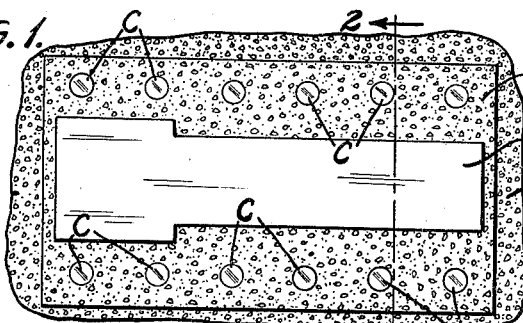
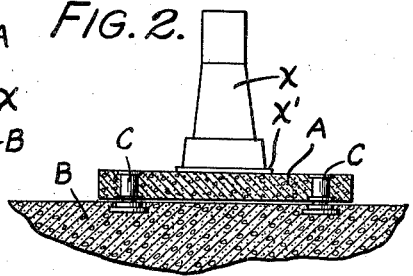
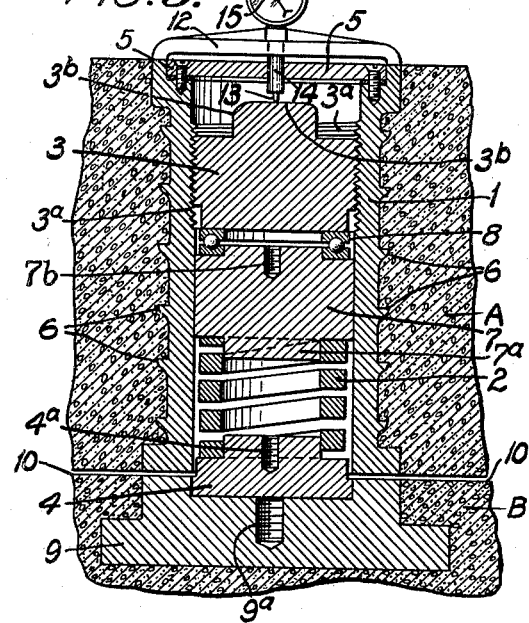
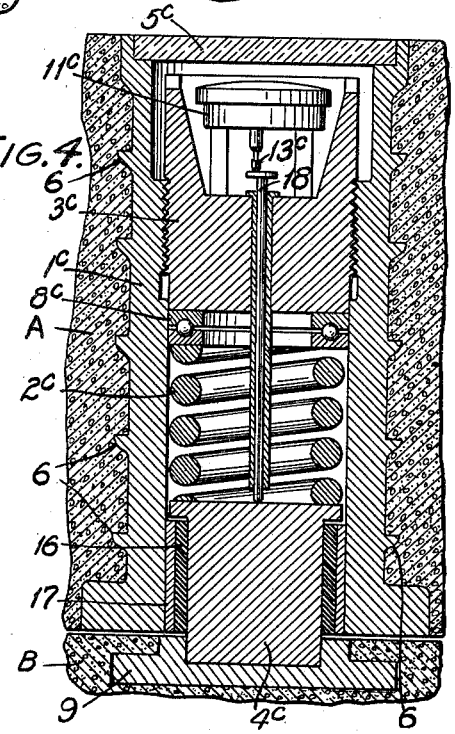
INVENTOR
GEORGE D. POGUE
BY Bakewell & Church
ATTORNEYS Aug. 9, 1938.   G. D. POGUE   2,126,660
SPRING TYPE VIBRATION ISOLATING APPARATUS
Filed Aug. 29, 1934   2 Sheets-Sheet 2
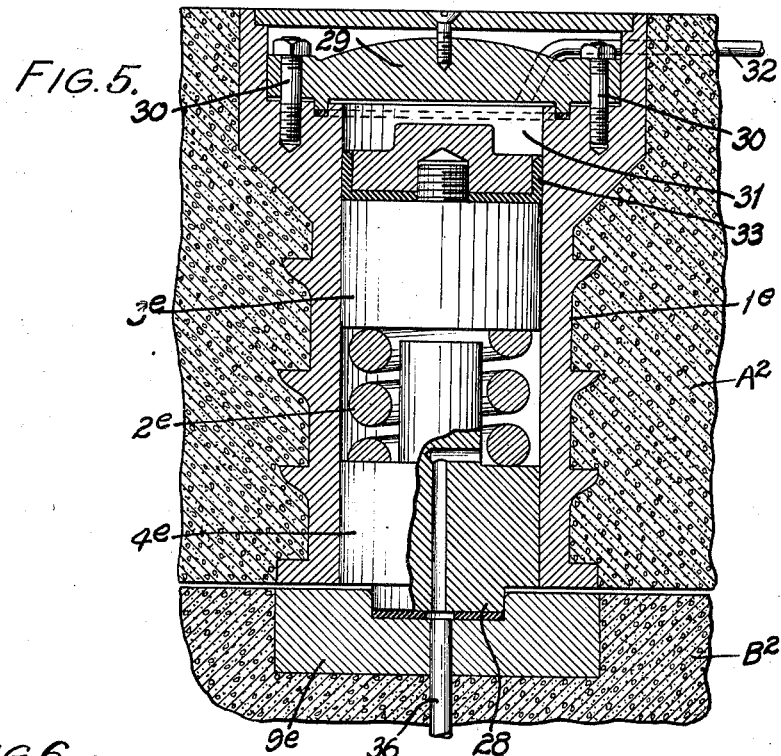
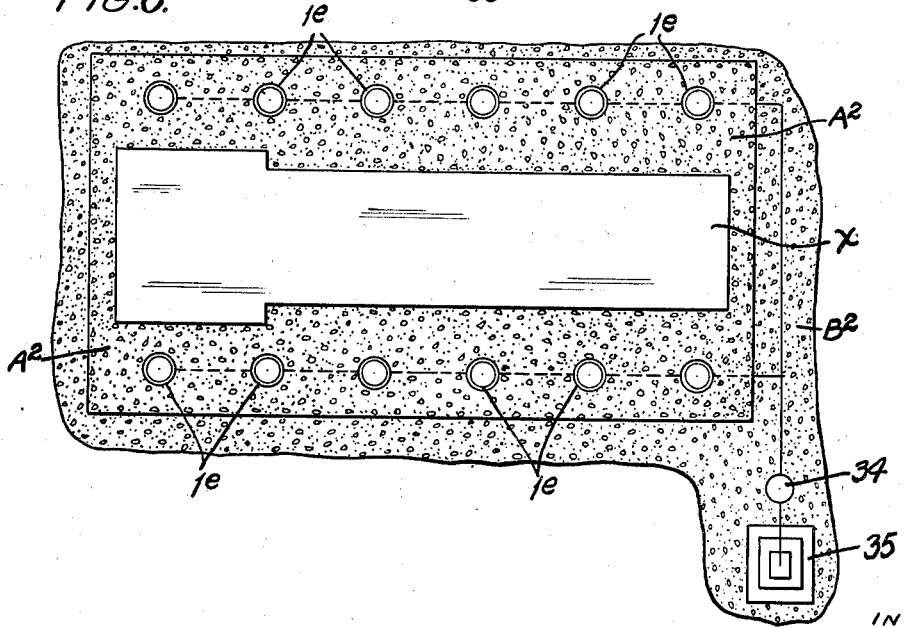
INVENTOR:
GEORGE D. POGUE.
BY Bakewell & Church
ATTORNEYS.

Patented Aug. 9, 1938

2,126,660

UNITED STATES PATENT OFFICE 2,126,660

SPRING TYPE VIBRATION ISOLATING APPARATUS

George D. Pogue, New York, N. Y., assignor to General Motors Corporation, a corporation of Delaware Application August 29, 1934, Serial No. 742,018

6 Claims. (Cl. 248—20)

This invention relates to apparatus of the general class that are used for preventing the vibrations of an engine or machine from being transmitted to the building or structure within which or upon which the engine or machine is installed, and particularly, anti-vibration-supporting apparatus of the type that employ springs for taking up or absorbing the vibrations of the engine or machine.

The main object of my invention is to provide a spring type vibration isolating apparatus which is of such design or construction that the springs are easily accessible for inspection, replacement or adjustment, without the necessity of jacking up or otherwise disturbing the engine or machine, or the supporting base to which it is rigidly attached.

Another object is to provide a spring type vibration isolating apparatus whose springs can be easily adjusted to vary the compression of same, thereby enabling the apparatus to be accurately adjusted to the particular load which it is intended to support.

Another object is to provide an adjustable spring type vibration isolating apparatus of the kind just mentioned, in which adjustments of the apparatus may be made while the engine or machine with which the apparatus is used is in operation.

Another object is to provide an adjustable spring type vibration isolating apparatus that is equipped with indicators or other equivalent means, by which the operator in charge of the apparatus can determine accurately and quickly whether the springs of the apparatus are functioning properly, and whether the apparatus is adjusted to operate efficiently.

Another object is to provide a spring type vibration isolating apparatus whose supporting springs can be arranged so as to effectively counteract forces which tend to cause the engine or machine with which the apparatus is used, to rock back and forth at right angles to the longitudinal center line of the machine.

Another object is to make it feasible or practicable to employ anti-vibration steel springs to support and absorb the vibrations of a reinforced concrete base of relatively great mass and area, to which a large Diesel engine or other large sized, heavy machine is rigidly attached.

And still another object is to provide a spring type vibration isolating apparatus that comprises a movable base to which the engine or machine is rigidly attached, and means for absorbing vertical vibrations and also minor horizontal vibrations set up in said base. Other objects and desirable features of my invention will be hereinafter pointed out.

Figure 1 of the drawings is a stop plan view of my improved vibration isolating apparatus combined with a Diesel engine.

Figure 2 is a transverse sectional view, taken on approximately the line 2—2 of Figure 1, showing the engine and the spring supporting units in elevation.

Figure 3 is a vertical longitudinal sectional view, illustrating one type of spring supporting unit with which the apparatus may be equipped.

Figure 4 is a vertical longitudinal sectional view, illustrating a spring supporting unit of slightly different construction from the one shown in Figure 3.

Figure 5 is a vertical longitudinal sectional view of a spring supporting unit designed for use in an apparatus that employs an hydraulic medium to vary the tension of the supporting springs of the apparatus; and Figure 6 is a top plan view of an apparatus of the kind just referred to, equipped with spring supporting units of the kind shown in Figure 5.

Briefly described, my invention consists of a vibration isolating apparatus, or anti-vibration supporting apparatus, composed of a movable support or base to which is rigidly attached the machine, engine or other device whose vibrations are to be absorbed, a stationary base or supporting structure arranged under said movable base, and supporting springs for said movable base sustained by said stationary base and arranged so that they can be inspected, replaced or adjusted without the necessity of jacking up or otherwise disturbing said movable base or the machine or engine thereon. Said springs are accessible from the top side of the movable base, and they are positioned in spring cages that are imbedded in the movable base, the spring cages being located within the marginal edge of the movable base at a point outside of or beyond the marginal edge of the base plate of the engine or machine that is rigidly attached to the movable base. The movable base is in the form of an oblong slab of molded concrete, and the same is of considerable thickness, and the supporting springs are arranged within and between the upper and lower surfaces of said slab, the lower ends of said springs being supported from the stationary base so that the slab or movable base is supported from the stationary base through and by the springs. In order that the operator in charge of the apparatus may determine easily, quickly and accurately whether the supporting springs are functioning properly, and whether the apparatus is adjusted to attain the highest degree of efficiency, the spring supporting units are equipped with dial indicators or equivalent devices, or are so constructed that such indicating devices may be easily applied to the spring supporting units, to estimate or determine the actual load in pounds which each supporting spring of the apparatus sustains or carries, the apparatus being so constructed that such readings or compilations may be made without stopping or discontinuing the operation of the engine or machine with which the apparatus is used. In one specific instance where my invention is in commercial use in an office building for isolating the vibrations of a 500 H. P. Diesel engine combined with a direct current generator having a speed of over 350 R. P. M., the reinforced concrete floating slab that supports the Diesel generating unit above referred to, is about 12 ft. 6 inches wide, 25 feet long and 2 feet thick. The total weight of the floating slab is about 85,000 lbs., and the weight of the engine, generator, piping, etc. is about 85,000 lbs., thus making a total load of about 85 tons. The "entablature" or floating concrete slab, is designed so that it has sufficient mass or weight to give a natural period of vibration of not less than approximately one-third of the frequency of the exciting forces. In the above referred to installation the frequency of the principal exciting forces are approximately 18.75 cycles per second, and the floating slab and inert mass carried by same, have a natural period of vibration of about 6 cycles or less per second. In the case of a marine installation, the "entablature" or movable base of the apparatus, would ordinarily be made of other material than reinforced concrete, usually structural steel, but it would be designed so as to have a similar frequency relationship between the natural period of the floating mass and the exciting forces.

The supporting springs of the apparatus preferably consist of helical springs, and they can be combined with the spring cages in various ways, without departing from the spirit of my invention. Various means may also be used to adjust the springs to vary the compression of same, but I prefer either to equip each spring supporting unit with a manually adjustable screw thread part that acts as an abutment member, or thrust piece for the spring of the unit, or equip each spring unit with a cylinder to which an hydraulic medium may be admitted or exhausted so as to vary the compression of the spring of the unit.

In Figures 1 and 2 of the drawings I have illustrated my invention embodied in an apparatus that is used to prevent the vibrations of a Diesel engine X from being transmitted or communicated to the building in which the engine is located. The apparatus comprises a movable base A of relatively great mass and weight, preferably constructed of reinforced concrete, to which the engine X is permanently and immovably attached in any suitable way, a stationary base B formed usually by the rock subfoundation of the building in which the building is installed, and a plurality of spring supporting units, designated by the reference characters C, sustained by the stationary base B and combined with the movable base A in such a way that they will support said movable base and the load thereon and hold said movable base in spaced relationship with the stationary base B. One of the novel and distinguishing characteristics of my improved apparatus is, that the supporting springs relied upon to prevent the vibrations set up in the engine or machine from being transmitted to the structure within which or upon which the engine or machine is installed, are easily accessible at all times for inspection, replacement, or adjustment, and moreover, that such inspections, replacements or adjustments may be made without the necessity of jacking up, raising or otherwise disturbing said engine or machine or the base to which it is rigidly attached. This feature of my improved apparatus not only materially reduces the maintenance cost of vibration isolating apparatus, but it makes it feasible or practicable to use a spring type vibration isolating apparatus with a large Diesel engine attached to a massive reinforced concrete base whose weight plus the weight of the engine runs up to several hundred thousand pounds.

As shown in Figure 1, the supporting units C are positioned beyond the marginal edge of the base plate $x'$ of the engine X, and are so located or distributed over the area of the movable base A, that an approximately equal proportion of the combined weight of said movable base and the load thereon is carried by each spring unit C. As previously stated, the spring units C are combined with the movable base A in such a way that they are accessible from the top side of said movable base, whereby the springs of said units may be replaced or adjusted while the engine is in operation. The type of spring unit C illustrated in Figure 3 comprises a spring cage 1, imbedded in the movable base A and provided with an open upper end accessible from the top side of said base, a helical spring 2 positioned inside of the cage 1 and sustained by the stationary base B, or a part combined with said stationary base, and an abutment member or thrust piece 3 in the cage 1 on which the force of the spring 2 is exerted in a direction tending to raise the movable base A and hold it in spaced relationship with the stationary base B, all the spring unit parts being located between the upper and lower surfaces of the movable base or slab A, as will be appreciated. The lower end of the spring cage 1 is also open, so that the lower end of the spring 2 may contact with a spring seat 4 on the stationary base B that projects upwardly into the open lower end of the spring cage 1 and which serves as a pedestal or guiding device for the movable base that permits it to move vertically relatively to the stationary base B, but which effectively holds said movable base A against lateral or horizontal movement relatively to the stationary base. The abutment member 3 is provided with external screw threads that mesh with internal screw threads 3a on the upper end portion of the side wall of the cage 1, and a non-circular-shaped portion 3b or equivalent means is formed on the upper end of the abutment member 3, so that said member may be turned to increase or decrease the tension of the spring 2 after the cap or closure 5 at the upper end of the spring cage has been removed. The upper and lower ends of the cage 1 are flush with the top and bottom faces of the movable base A, and said cage is provided on its exterior with ribs 6 or an equivalent means which tends to produce effective bond between the spring cage and the concrete of which the movable base A is constructed.

In the spring supporting units shown in Figure 3 a plunger 7 that snugly fits the interior of the cage 1 is interposed between the abutment member 3 and the upper end of the spring 2, and a friction reducing bearing 8, which may be of the ball type or roller type, is interposed between said plunger and abutment member, so as to facilitate the adjustment or turning of said abutment member to vary the tension of the spring 2. The spring 2 is so proportioned that the exterior of same is spaced slightly away from the inner surface of the cage 1, and the plunger 7 is provided on its underside with a depending projection 7a that fits snugly inside of the upper end of the spring 2, with the result that the extreme upper end of said spring is anchored to the plunger 7 in such a way that said spring cannot shift laterally or horizontally relatively to said plunger. It is immaterial how the lower end of the spring 2 is supported on the stationary base B, but I prefer to imbed a bearing plate 9 in the top side of said stationary base and anchor the lower end of the spring 2 to said bearing plate by means of the spring seat 4 previously referred to, said spring seat being stepped or provided with three portions of different diameter, the lower portion, which is of the greatest diameter, fitting snugly in a cylindrical recess in the bearing plate 9, the upper portion, which is of the least diameter, fitting snugly inside of the lower end of the spring 2, and the intermediate portion of said spring seat 4 being of such diameter that it projects into the lower end of the spring cage 1, but does not bear directly against or have a metal to metal contact with said cage. In constructing the stationary base B, the bearing plate 9 is securely anchored to the top face of same by concrete that forms all or a portion of said base.

In an apparatus equipped with spring supporting units of the kind illustrated in Figure 3 the springs of said units will effectively take up the vertical vibrations of the movable base and the load thereon, and prevent said vibrations from being transmitted to the stationary base, and the springs of said units will also take up slight horizontal vibrations, due to the fact that said springs are combined with their cages and with the stationary base in such a way that said springs are capable of a slight lateral flexing movement. In the operation of constructing the stationary base, the bearing plate 9 is usually sustained or held in correct position by a supporting member, not shown, to which said bearing plate is temporarily attached by a bolt or stud positioned in a threaded hole 9a in the bearing plate. In the operation of casting or molding the movable base A care must be taken to maintain the cages 1 in exact longitudinal alignment with the cylindrical recesses in the top faces of the bearing plates 9 that are adapted to receive the spring seats 4, so that when the parts of the apparatus are assembled, the spring seats 4 will project upwardly into the cages 1 without directly contacting with the side walls of said cages. Preferably, each spring seat 4 is provided in its top side with a threaded hole 4a and a threaded hole 7b is also formed in the top side of each plunger 7, so as to permit said parts to be attached to a threaded rod that is used to install or remove said parts.

The movable base A is cast or poured directly on the stationary base B, and in order to prevent said parts from adhering to each other, a sheet 10 of waterproof material is superimposed upon the stationary base B before pouring or installing the concrete that constitutes the movable base A.

After said bases have been completed, the spring seats 4, springs 2, plungers 7 and abutment members 3 are installed, after which said abutment members are adjusted to compress the springs 2 to such a degree as to raise the movable base from $\frac{1}{32}$ of an inch to $\frac{1}{16}$ of an inch from the top face of the stationary base. After being so adjusted, the apparatus will effectively take up or absorb the vertical vibrations of the engine X and the movable base A. It will also take up minor horizontal vibrations, due to the fact that the springs 2 are spaced slightly away from the interior of the spring cages and are securely anchored at the upper ends to the plungers 7 which snugly fit the spring cages, and securely anchored at their lower ends to the spring seats 4, which, in turn, are held in the stationary base in such a way that they cannot move laterally or horizontally, the intermediate portions of said spring seats which are positioned inside of the spring cages being enough smaller than the inside diameter of the cages to not bear against the same when the springs 2 are functioning to take up slight horizontal vibrations of the movable base A.

The dial indicators or other means employed to indicate the amount of compression of the springs of the various spring units, may be of various types and kinds. In the spring unit shown in Figure 3 11 designates the dial of an indicator provided with a supporting yoke 12 which rests upon the upper end of the spring cage 1, and provided with a vertically-movable spindle 13 whose lower end is adapted to contact with the top face of the part 3b on the upper end of the adjustable abutment member 3, said spindle 13 being guided by a sleeve 14 on the yoke piece 12 that projects downwardly through a hole in the removable closure or cap plate 5 at the upper end of the spring cage. A change in the position of the spindle 13 effects a change in the position of the hand or pointer 15 of the indicator, and inasmuch as the lower end of said spindle contacts with the adjustable abutment member 3, a change in the height or level of said abutment member, relatively to the cage 1, will cause said hand 15 to take a different position on the dial 11 of the indicator. Ordinarily, the dial 11 will be graduated from zero to 100, each division representing 1/1000 of an inch. For arriving at the exact load on the spring 2 of the unit, a constant or multiplier is employed. For example, if the spring 2 shows a deflection of .001″ per hundred pounds of compression load, then the constant would be 100. If the hand or needle 15 stands at the numeral 87 on the dial, this would indicate that the compression pressure on that particular supporting spring of the apparatus is 8,700 pounds. For a heavier or stronger spring the constant or multiplier would, of course, be higher. While my broad idea contemplates the use of any kind of suitable supporting springs, I prefer to use helical springs made of square or rectangular stock. Springs thus made have an advantage over springs made from round stock, in that a better bearing is provided for the bosses or projections on the movable abutment member 3 and spring seat 4 of each unit to which the upper and lower ends of the spring are anchored. Moreover, square stock springs can be more easily calibrated or matched by a grinding operation which removes stock from the outside of the surface of the spring, even if the spring has been hardened by a heat treating process.

In Figure 4 I have illustrated a spring unit which differs from the one shown in Figure 3, in that a dial indicator or equivalent means is built into the unit, and a non-metallic, resilient material such as rubber or cork is employed to prevent the minor horizontal vibrations of the movable base or support A from being transmitted to the stationary base B. The cage 1c of said unit is imbedded in the movable base A, and the stationary base B is provided in its top face with a cylindrical recess or depression that is adapted to snugly receive a spring seat 4c that projects upwardly into the open lower end of said spring cage so that it will serve as a support for the spring 2c, whose upper end is separated from the adjustable abutment member or thrust piece 3c by means of a friction reducing bearing 8c. The spring seat 4c is so proportioned that it does not engage or have a metal to metal contact with the side wall of the spring seat 1c, and a sleeve 16 of rubber, cork, or other suitable non-metallic, resilient material is interposed between the spring seat 4c and the lower end portion of the side wall of the cage 1c so as to absorb or take up minor horizontal vibrations of the movable base A and the load thereon. Preferably, the cork or rubber sleeve 16 is encased in a metallic sleeve 17 slidably fitted into the lower end of the spring cage 1c so as to protect the sleeve 16 from wear, and if desired, the cork or rubber material 16 may be cemented or otherwise permanently connected to the metallic protecting sleeve 17 and the spring seat 4c. The adjustable abutment member 3c is provided in its top side with a depression or pocket, in which is positioned a conventional dial indicator, designated as an entirety by the reference character 11c and provided with a spindle 13c that is adapted to engage a push rod 18 whose lower end contacts with the top face of the spring seat 4c, whereby a change in the height or elevation of the abutment member 3c, relatively to the spring cage 1c, will cause the pointer or needle of the indicator to assume a different position on the dial of the indicator. The upper end of the spring cage 1c is normally closed by a cover plate 5c, preferably made of glass, which may be removed when it becomes necessary to adjust the spring unit or replace the parts of same.

As previously intimated, my invention is not limited to a spring type vibrating elimination apparatus in which the spring supporting units are provided with manually-adjustable abutment members or thrust pieces for transmitting the force of the springs to the movable base that carries the engine or machine whose vibrations are to be absorbed. If desired, the apparatus may be equipped with an hydraulic means for adjusting or varying the compression of the supporting spring, such, for example, as is illustrated in Figures 5 and 6. In such an apparatus each of the spring supporting units will comprise a spring cage 1e imbedded in or attached to the movable base A², a helical spring 2e arranged inside of said spring cage, a piston or plunger 3e in the upper portion of the spring cage on which the spring 2e exerts upward pressure, and a spring seat 4e fitted snugly into the lower end portion of the cage 1e and provided with a depending cylindrical projection 28 that fits snugly in a cylindrical recess formed in the top side of a bearing plate 9e that is imbedded in the top face of the stationary base B² of the apparatus. The upper end of the spring cage 1e has a removable head piece 29 securely connected to same by bolts 30, so that the upper end portion of the spring cage 1e will constitute a cylinder 31 to which an hydraulic medium may be admitted and exhausted by a supply pipe 32, the piston or plunger 3e that constitutes a movable abutment or thrust piece for the spring 2e being provided with a packing 33 so as to maintain a tight joint between same and the side wall of the cylinder 31. The spring units are arranged beyond or outside of the marginal edge of the engine or other machine that is rigidly connected to the movable base A², and the cylinders or pressure chambers 31 of the various spring supporting units are connected to a distributing system in such a way that an equal compression pressure will be maintained on the springs of all the units, the reference character 34 in Figure 6 being used to indicate diagrammatically a reservoir for storage under pressure of glycerine or other suitable liquid, which is supplied to or exhausted from the pressure chambers 31 of the spring units, and the reference character 35 indicating diagrammatically a pump for maintaining the supply of liquid to the system. In Figure 5 the reference character 36 indicates a drain leading from the recess or depression in the top face of the bearing plate 9e for taking care of any seepage past the packing of the plunger 3e.

Having thus described my invention, what I claim as new and desire to secure by Letters Patent is:

1. A vibration isolating apparatus, comprising a movable base adapted to have a machine or engine attached to same, a stationary base above which said movable base is arranged, approximately open-ended, tubular spring cages combined with said movable base, helical springs in said spring cages sustained by said stationary base, adjustable thrust pieces in said cages on which said springs exert pressure in a direction tending to raise said movable base from said stationary base, said thrust pieces being screwed into the side walls of said cages and said cages having openings at the upper ends of same through which said springs and thrust pieces may be removed, and dial indicators provided with parts that co-act with said thrust pieces to cause the needles or hands of the indicators to assume different positions on their co-operating dials according to the height or elevation of said thrust pieces relatively to their co-acting cages.

2. In a vibration isolating apparatus, the combination of a movable base to which a machine or engine is rigidly attached, a stationary base arranged under said movable base, a vertically-disposed, open-ended, cylindrical spring cage combined with said movable base, a plunger fitting snugly in said cage, a compression spring interposed between said plunger and the stationary base, an adjustable thrust piece in the upper end portions of said cage accessible through the open upper end of same, and a friction-reducing bearing arranged between said thrust piece and plunger.

3. A vibration isolating apparatus, comprising a stationary base, a movable base to which a machine or engine is adapted to be rigidly attached, spring cages carried by said movable base and arranged beyond the marginal edges of the machine carried by said movable base, springs in said spring cages sustained by said stationary base for maintaining said movable base in spaced relationship with said stationary base, and an hydraulic means for varying the compression of said springs.

4. A vibration isolating apparatus, comprising a stationary base, a movable base adapted to have an engine or machine rigidly secured thereto, said movable base having parallel upper and lower surfaces spaced apart from one another, helical springs located between the upper and lower surfaces of said movable base for supporting said movable base, the lower ends of said springs being supported from said stationary base, and said springs being arranged beyond the marginal edges of the machine carried by said base and within the marginal edges of said movable base, and adjustable abutment members carried by said movable base and located within and between the upper and lower surfaces of said movable base and against which the upper ends of said springs exert pressure in a direction to move said base upwardly, said abutment members being removable from the top side of said movable base so as to provide access to said springs.

5. A vibration isolating apparatus, comprising a movable base adapted to have a machine or engine secured thereto, said movable base having upper and lower surfaces spaced apart from one another, a stationary base arranged beneath said movable base, open-ended cages embedded in said movable base and located between the upper and lower surfaces thereof and beyond the perimeter of the base contacting portion, of a machine secured to said movable base, compression springs in said cages and sustained by said stationary base, and abutment members for said springs arranged in said spring cages so as to be accessible and removable from the top side of said movable base without disturbing the machine thereon, said abutment members being adjustable within said spring cages to vary the compression of said springs so as to cause them to support equal parts of the weight of said movable base and the machine or engine secured thereto.

6. A vibration isolating apparatus comprising a massive movable concrete base, a stationary base, spring cages imbedded in said movable base, springs in said spring cages sustained by said stationary base, adjustable thrust pieces in said spring cages on which said springs abut to support said movable base, and openings in said cages opposite said stationary base through which said thrust pieces may be adjusted.

GEORGE D. POGUE.